(12) United States Patent
Napierala

(10) Patent No.: US 12,255,823 B2
(45) Date of Patent: Mar. 18, 2025

(54) APPARATUSES AND METHODS FOR ENHANCING OPERATIONS IN RELATION TO A BARE-METAL PRIVATE CLOUD ARCHITECTURE

(71) Applicant: AT&T Intellectual Property I, L.P., Atlanta, GA (US)

(72) Inventor: Maria Napierala, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 350 days.

(21) Appl. No.: 17/678,742

(22) Filed: Feb. 23, 2022

(65) Prior Publication Data

US 2023/0269189 A1 Aug. 24, 2023

(51) Int. Cl.
| | |
|---|---|
| H04W 56/00 | (2009.01) |
| H04L 9/40 | (2022.01) |
| H04L 12/46 | (2006.01) |
| H04L 47/24 | (2022.01) |
| H04L 61/25 | (2022.01) |

(52) U.S. Cl.
CPC .......... *H04L 47/24* (2013.01); *H04L 12/4641* (2013.01); *H04L 61/25* (2013.01); *H04L 63/0245* (2013.01); *H04L 63/1425* (2013.01)

(58) Field of Classification Search
CPC ..... H04L 47/24; H04L 12/4641; H04L 61/25; H04L 63/0245; H04L 63/1425
USPC ....................................................... 370/235
See application file for complete search history.

(56) References Cited

U.S. PATENT DOCUMENTS

| | | | |
|---|---|---|---|
| 9,763,078 B1* | 9/2017 | Zheng | H04W 8/12 |
| 9,916,545 B1* | 3/2018 | de Kadt | G06Q 10/06 |
| 10,361,843 B1* | 7/2019 | Suthar | H04L 9/3257 |
| 10,482,239 B1* | 11/2019 | Liu | G06F 21/563 |
| 2012/0213225 A1* | 8/2012 | Subramanian | H04L 45/586 370/392 |
| 2016/0226766 A1* | 8/2016 | Al-Zoubi | H04L 45/64 |
| 2019/0141015 A1* | 5/2019 | Nellen | H04L 63/0272 |
| 2021/0111925 A1* | 4/2021 | Jiang | H04L 41/0806 |
| 2022/0147253 A1* | 5/2022 | Sajeepa | G06F 3/0632 |
| 2022/0188954 A1* | 6/2022 | Callaghan | H04L 9/3231 |
| 2022/0217045 A1* | 7/2022 | Blau | H04L 41/0895 |

OTHER PUBLICATIONS

"Azure for operators", https://azure.microsoft.com/en-us/industries/telecommunications/#overview, Accessed online Feb. 17, 2022, Feb. 17, 2022, 15 pgs.
Marko, "What is bare-metal cloud", https://www.techtarget.com/searchstorage/definition/bare-metal-cloud, Accessed online Feb. 17, 2022, Feb. 17, 2022, 6 pgs.

* cited by examiner

*Primary Examiner* — Sai Ming Chan
(74) *Attorney, Agent, or Firm* — Guntin & Gust, PLC; Robert Gingher

(57) ABSTRACT

Aspects of the subject disclosure may include, for example, obtaining traffic that is conveyed at least in part within a private cloud network, based on the obtaining, identifying characteristics of the traffic, and based on the identifying of the characteristics of the traffic, causing at least one action to be performed within the private cloud network. Other embodiments are disclosed.

20 Claims, 10 Drawing Sheets

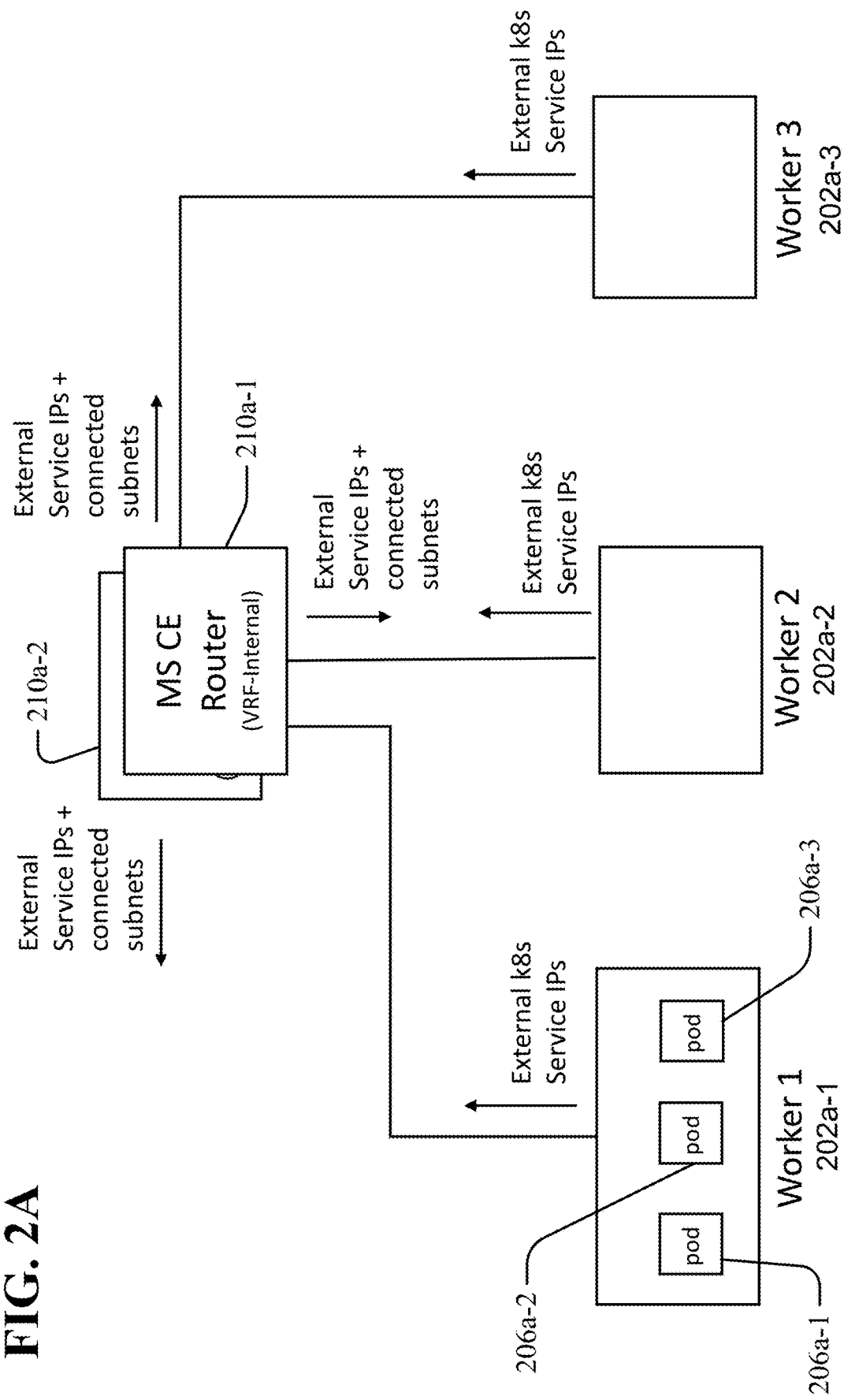

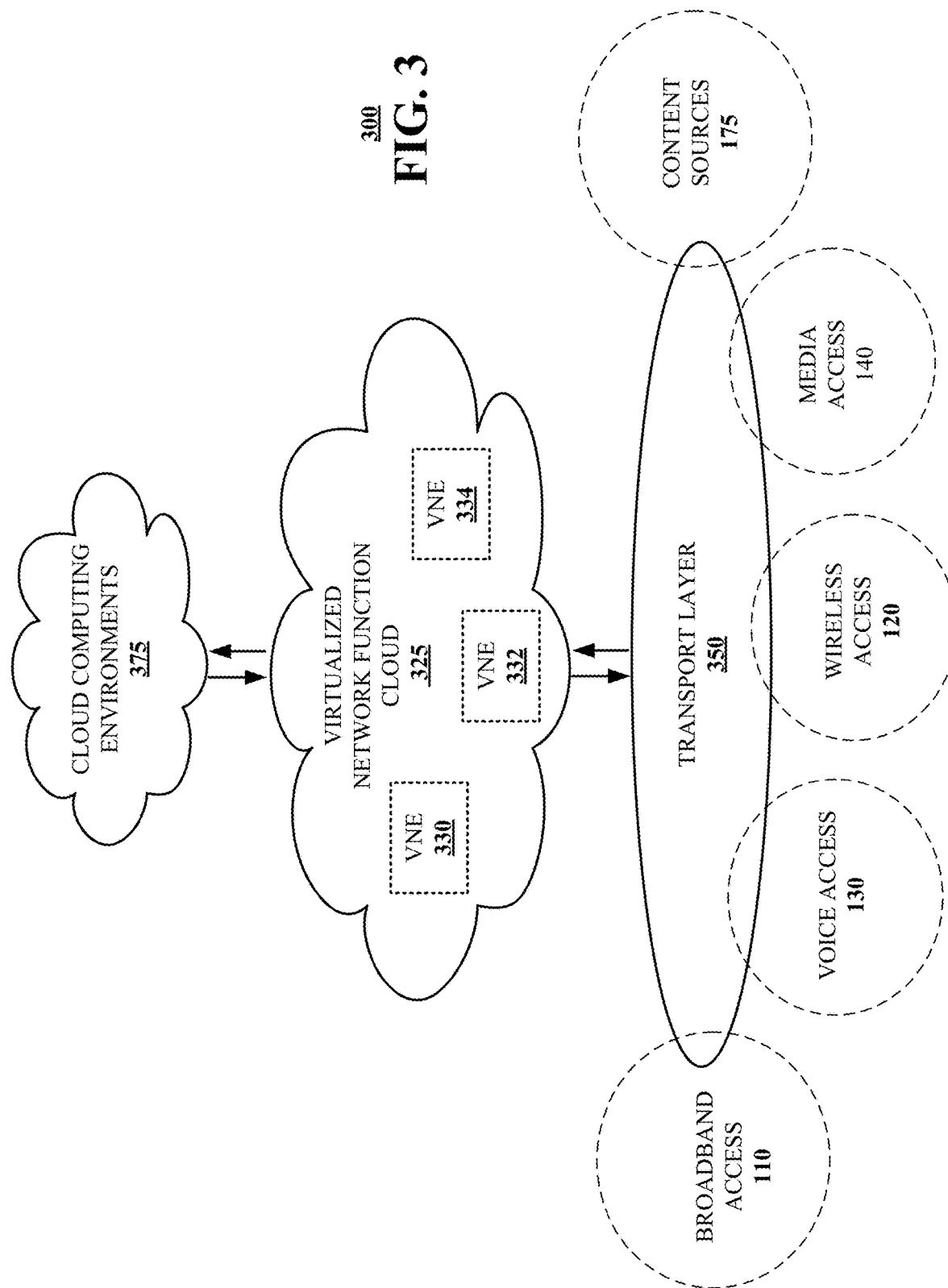

APPARATUSES AND METHODS FOR ENHANCING OPERATIONS IN RELATION TO A BARE-METAL PRIVATE CLOUD ARCHITECTURE

FIELD OF THE DISCLOSURE

The subject disclosure relates to apparatuses and methods for enhancing operations in relation to a bare-metal private cloud architecture.

BACKGROUND

As the world is increasingly becoming connected via vast communication systems and networks, and via various communication devices, network operators and service providers are increasingly being confronted by additional challenges in terms of managing resources (e.g., finite budgets) while at the same time ensuring high qualities of service and experience and reliability. Cloud computing architectures have been utilized to facilitate a provisioning of services (e.g., communication services), whereby a cloud operator/provider may provide hardware/software/firmware in a bare-metal platform/architecture. Constructs of the platform/architecture may be configured to achieve/realize specified goals, objectives, functionalities, requirements, etc.

As a result of an adoption of a cloud computing platform, a user (e.g., a customer) of the platform may be freed of having to manage many of the details associated with the utilization of the infrastructure of the platform. However, the user might not be completely freed from such tasks, as decisions that might otherwise be made by a private cloud operator could potentially impact (e.g., negatively impact) the results or efficiencies associated with an application operated or managed by the user. For example, interoperability, reliability, functionality, etc., associated with one or more applications managed/operated by the user could be compromised if the decision-making processes were left solely to the cloud operator. Still further, the user may add, remove, and/or modify one or more applications, such as for example in relation to a roll-out of a new technology, a decommissioning of a legacy technology, changes in demand (e.g., subscriber demand), etc. The dynamic nature of the applications (and associated traffic) operated/managed by the user represents yet another complexity in relation to the utilization of private cloud computing resources. Furthermore, there may instances where there is a desire to shield/mask identifiers associated with resources of the cloud platform. While such shielding/masking may promote security or efficiency (e.g., a reduction in the number of (public-facing or external) addresses that may be utilized), it may come at the cost of added complexity in terms of being able to access or reach the resources.

BRIEF DESCRIPTION OF THE DRAWINGS

Reference will now be made to the accompanying drawings, which are not necessarily drawn to scale, and wherein:

FIGS. 2A-2D are block diagrams illustrating example, non-limiting embodiments of systems for processing communications or traffic in accordance with various aspects described herein.

FIG. 3 is a block diagram illustrating an example, non-limiting embodiment of a virtualized communication network in accordance with various aspects described herein.

DETAILED DESCRIPTION

Figure 1:
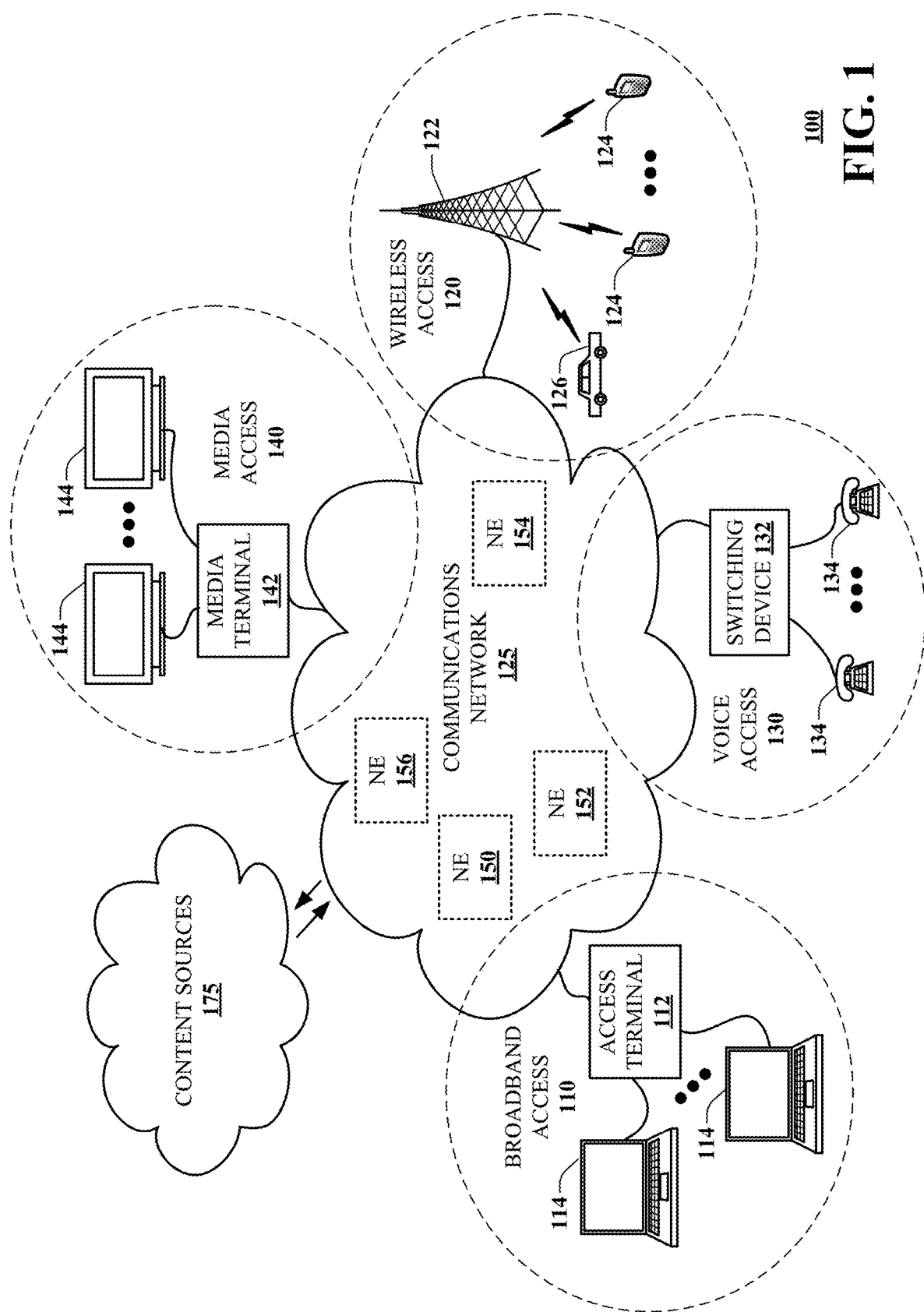
FIG. 1 is a block diagram illustrating an exemplary, non-limiting embodiment of as system including a communications network in accordance with various aspects described herein.

The subject disclosure describes, among other things, illustrative embodiments for facilitating a processing of communications or traffic in one or more networks, potentially inclusive of a bare-metal private cloud network. Other embodiments are described in the subject disclosure.

One or more aspects of the subject disclosure include, in whole or in part, obtaining traffic that is conveyed at least in part within a private cloud network; based on the obtaining, identifying characteristics of the traffic; and based on the identifying of the characteristics of the traffic, causing at least one action to be performed within the private cloud network.

One or more aspects of the subject disclosure include, in whole or in part, identifying first characteristics of first traffic, wherein the first characteristics include an identification of the first traffic as being associated with a control plane and an identification that the first traffic traverses a boundary of a first network corresponding to a bare-metal private cloud network; based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network; identifying second characteristics of second traffic originating from a first pod of a first node of the first network, wherein the second characteristics include an identification of the second traffic as being associated with a user plane; based on the identifying of the second characteristics of the second traffic, conveying the second traffic between the first pod and the first router of the second network via a first virtual routing function (VRF) of a second router of the first network and a link between the second router and the first router; identifying third characteristics of third traffic originating from a second pod of the first node of the first network, wherein the third characteristics include an identification of the third traffic as being associated with the user plane; and based on the identifying of the third characteristics of the third traffic, conveying the third traffic between the second pod and the first router of the second network via a second VRF of the second router and the link.

One or more aspects of the subject disclosure include, in whole or in part, obtaining, by a processing system including a processor, first traffic from a first node of a private cloud network; identifying, by the processing system and based on the obtaining, that the first traffic corresponds to an execution of a first application associated with a telecommunication service; instantiating, by the processing system and based on the identifying, an appliance; and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

Referring now to FIG. 1, a block diagram is shown illustrating an example, non-limiting embodiment of a system 100 in accordance with various aspects described herein. For example, system 100 can facilitate in whole or in part obtaining traffic that is conveyed at least in part within a private cloud network, based on the obtaining, identifying characteristics of the traffic, and based on the identifying of the characteristics of the traffic, causing at least one action to be performed within the private cloud network. System 100 can facilitate in whole or in part identifying first characteristics of first traffic, wherein the first characteristics include an identification of the first traffic as being associated with a control plane and an identification that the first traffic traverses a boundary of a first network corresponding to a bare-metal private cloud network, based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network, identifying second characteristics of second traffic originating from a first pod of a first node of the first network, wherein the second characteristics include an identification of the second traffic as being associated with a user plane, based on the identifying of the second characteristics of the second traffic, conveying the second traffic between the first pod and the first router of the second network via a first virtual routing function (VRF) of a second router of the first network and a link between the second router and the first router, identifying third characteristics of third traffic originating from a second pod of the first node of the first network, wherein the third characteristics include an identification of the third traffic as being associated with the user plane, and based on the identifying of the third characteristics of the third traffic, conveying the third traffic between the second pod and the first router of the second network via a second VRF of the second router and the link. System 100 can facilitate in whole or in part obtaining, by a processing system including a processor, first traffic from a first node of a private cloud network, identifying, by the processing system and based on the obtaining, that the first traffic corresponds to an execution of a first application associated with a telecommunication service, instantiating, by the processing system and based on the identifying, an appliance, and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a in accordance with various aspects described herein. In some embodiments, one or more parts/portions of the system 200a may function within, or may be operatively overlaid upon, one or more parts/portions of the system 100 of FIG. 1. The system 200a may be utilized in relation to one or more technologies. To demonstrate, in relation to a telecommunication service environment/platform, the system 200a may be utilized to facilitate aspects of a control plane (e.g., a 5G compliant control plane).

The system 200a may include one or more nodes, represented by a first worker 202a-1, a second worker 202a-2, and a third worker 202a-3. One or more of the workers 202a-1 through 202a-3 may be associated with an execution of a respective portion of one or more applications. For example, the first worker 202a-1 may be responsible for the execution of a first portion of a first application, the second worker 202a-2 may be responsible for the execution of a second portion of the first application, and the third worker may be responsible for the execution of a (first portion of a) second application. In some embodiments, redundancy may be included amongst the workers to facilitate reliability/availability in the event of, e.g., inoperability or excessive loading (e.g., loading in an amount greater than a threshold) amongst a given worker. Thus, assuming that the first worker 202a-1 is responsible for the execution of the first portion of the first application as described above, another worker (e.g., the third worker 202a-3) may serve as a backup with respect to (at least a part of) the execution of the first portion of the first application in the event that the first worker 202a-1 becomes inoperable (e.g., fails) or is managing an excessive load.

Within a given worker, there may be included one or more pods. For example, as shown in FIG. 2A the first worker 202a-1 may include a first pod 206a-1, a second pod 206a-2, and a third pod 206a-3. The workers 202a-2 and 202a-3 may include one or more of their own respective pods (which are omitted in FIG. 2A for the sake of simplicity in illustration). In some embodiments, the pods 206a-1 through 206a-3 may be representative of respective virtual machines that may execute a part of a given application. Much like the redundancy/replication described above in respect of the workers, in some embodiments redundancy/replication may be included/incorporated as part of two or more pods (e.g., two or more pods of a given worker) to facilitate/ensure reliability or load sharing/balancing. In some embodiments, a pod may be implemented using software.

The use of three pods 206a-1 through 206a-3 running in the worker node 202a-1 (where the worker node 202a-1, or any worker node for that matter, may correspond to a server and/or a virtual machine) in FIG. 2A is illustrative, which is to say that in some embodiments more or fewer than three pods within a given worker node may be utilized/included. Similarly, the use of three worker nodes 202a-1 through 202a-3 in FIG. 2A is illustrative, which is to say that in some embodiments more or fewer than three workers may be utilized/included. The amount or extent of the use/inclusion of a given resource (e.g., a worker, a pod, etc.) in a given embodiment may be a function of the amount of load or complexity of the operations/functionality being facilitated by the system 200a (or corresponding application(s)). In some embodiments, the applications may adhere to/comply with one or more portions of one or more open-source platforms or technologies, such as for example Kubernetes (k8s). In some embodiments, network functions included within, or facilitated by, the system 200a may correspond to software implementations, such as implementations conforming to a cloud-native network function (CNF).

The workers 202a-1 through 202a-3 may be communicatively coupled to one or more routers. For example, the workers 202a-1 through 202a-3 may be communicatively coupled to a first router 210a-1 and/or a second router 210a-2. Much like the workers and the pods described above, the use of multiple routers (e.g., the routers 210a-1 and 210a-2) may facilitate redundancy/replication in relation to, e.g., reliability and/or load sharing/balancing.

The routers 210a-1 and 210a-2 may be referred to herein as MS CE routers, or customer edge (CE) routers for short. The nomenclature/labeling of the routers 210a-1 and 210a-2 as CE routers is exemplary, which is to say that no limitation is implied as a result of the use of the nomenclature; the nomenclature is adopted merely for the sake of historical context, as the term "CE" would be appreciated by one of skill in the art. The CE routers 210a-1 and 210a-2 may be sourced from, or associated with, one or more providers/operators.

The coupling between the workers 202a-1 through 202a-3 and the CE routers 210a-1 and 210a-2 may adhere or conform to one or more communication standards, protocols, conventions, technologies, techniques, or the like. For example, communications between the workers 202a-1 through 202a-3 and the CE routers 210a-1 and 210a-2 may conform to the border gateway protocol (BGP) and/or bidirectional forwarding detection (BFD). Aspects of the communications may correspond to internal BGP (iBGP) and/or external BGP (eBGP).

To facilitate communications or interoperability within the system 200a, each of the workers 202a-1 through 202a-3 may have an associated identifier or address, represented in FIG. 2A as External k8s Service IPs (or Service IPs for short). The CE routers 210a-1 and 210a-2 may maintain tables, potentially as part of one or more virtual routing and forwarding (VRF) functions, to facilitate communication exchanges based on the Service IPs. In this manner, within the cluster/domain represented by the workers 202a-1 through 202a-3, communications from a first of the workers (e.g., the worker 202a-1) may be provided/routed to other ones of the workers (e.g., the worker 202a-2 and/or the worker 202a-3) by way of the CE router 210a-1 and/or the CE router 210a-2.

The CE routers 210a-1 and 210a-2 may, in turn, be communicatively coupled to other CE routers, such as for example other CE routers of other clusters/domains included/incorporated as part of a private cloud network. Stated slightly differently, aspects of the system 200a may be replicated as part of a broader private cloud network. Communications between CE routers of different clusters/domains may conform to one or more addressing schemes, and tables or mappings may be maintained by the CE routers to facilitate such communications between clusters/domains. To demonstrate, a first table maintained by a given CE router may be used to map to various other CE routers that may be in communication with the given CE router; a second table maintained by the given CE router may be used to map to various workers within the domain of the given CE router. Other types or forms of table/list implementations are within the scope and spirit of this disclosure.

Thus, as described above, the system 200a may facilitate a processing of communications or traffic contained within, or across, resources of a private cloud network. In this respect, it may be said that the system 200a may facilitate east-west or horizontally-oriented communications within or amongst the resources of the private cloud network.

Figure 2B:
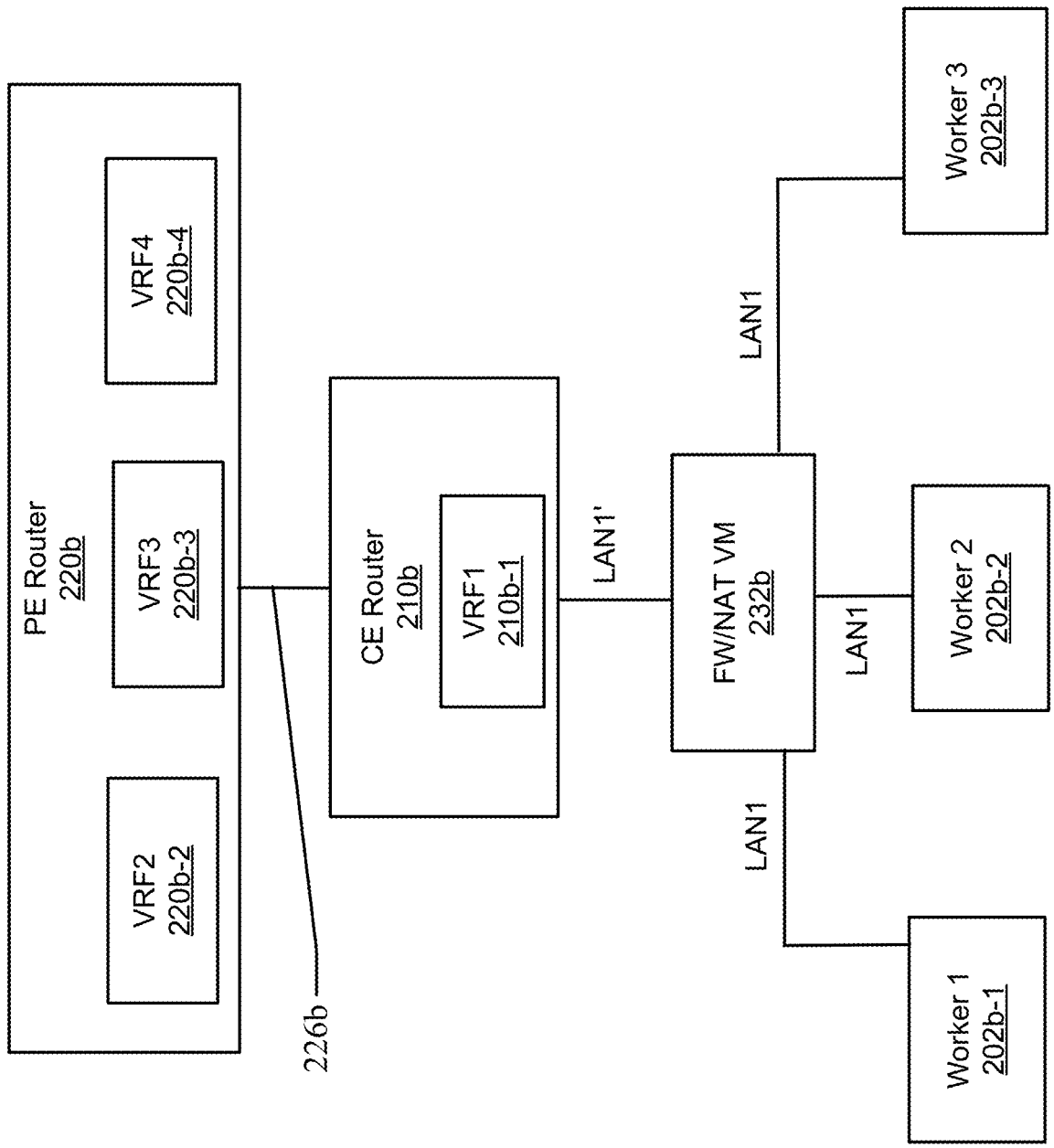

Referring now to FIG. 2B, an illustrative embodiment of a system 200b in accordance with aspects of this disclosure is shown. In some embodiments, one or more parts/portions of the system 200b may function within, or may be operatively overlaid upon, one or more parts/portions of the system 100 of FIG. 1. While shown separately, in some embodiments one or more aspects of the system 200b may be combined with one or more aspects of the system 200a, which is to say that aspects of the systems 200a and 200b may be included as part of a larger system. For example, whereas aspects of the system 200a were described above as facilitating east-west or horizontally-oriented communications/traffic in relation to a control plane (a 5G control plane, for example), aspects of the system 200b may facilitate a processing of north-south or vertically-oriented communications/traffic in relation to the control plane.

The system 200b may include one or more workers, such as for example a first worker 202b-1 (which may include/incorporate one or more aspects of the first worker 202a-1 of FIG. 2A), a second worker 202b-2 (which may include/incorporate one or more aspects of the second worker 202a-2 of FIG. 2A), and a third worker 202b-3 (which may include/incorporate one or more aspects of the third worker 202a-3 of FIG. 2A). The system 200b may include one or more CE routers, such as for example a CE router 210b (which may include/incorporate one or more aspects of the CE router 210a-1 and/or the CE router 210a-2 of FIG. 2A). The system 200b may include one or more other routers, such as for example a router 220b. The router 220b may be referred to herein as a provider edge (PE) router. The nomenclature/labeling of the router 220b as a PE router is exemplary, which is to say that no limitation is implied as a result of the use of the nomenclature; the nomenclature is adopted merely for the sake of historical context, as the term "PE" would be appreciated by one of skill in the art.

In some embodiments, the CE router 210b-1 may include one or more VRFs, such as for example a first VRF represented as VRF1 210b-1. The PE router 220b may include one or more VRFs, such as for example a second VRF represented as VRF2 220b-2, a third VRF represented as VRF3 220b-3, and a fourth VRF represented as VRF4 220b-4. Each of the VRFs of the PE router 220b may be associated with one or more routes or functions, such as for example Gn, OAM, and EXN.

In some embodiments, each VRF of the PE router 220b may have an associated link/channel to the CE router 210b (e.g., may have an associated link/channel to the first VRF1 210b-1) that is independent of the other VRFs of the PE router 220b. In other embodiments, two or more of the VRFs of the PE router 220b may share a common link/channel to the CE router 210b. For example, in FIG. 2B the PE router 220b is shown as being communicatively coupled to the CE router 210b via a link 226b. The link 226b may conform or adhere to one or more routing techniques or technologies, such as for example multi-protocol label switching (MPLS). Labels of MPLS may be used to establish multiple logical links between the CE router 210b and the PE router 220b utilizing the link 226b. For example, each of the VRFs of the PE router 220b may be associated with a respective label included in a plurality of labels, where each label may distinguish traffic/communications conveyed between the VRFs of the PE router 220b and the CE router 210b. The first VRF (VRF1 210b-1) of the CE router 210b may be MPLS/BGP virtual private network (VPN) enabled/compliant and may import any relevant VPN routing tables from the VRFs of the PE router 220b. In some embodiments, ranges of Service IPs may map to different VRFs of the PE router 220b, and that mapping may be included/maintained by one or more entities, such as for example the first VRF (VRF1 210b-1) of the CE router 210b.

In order to promote security and/or selective information-sharing/information-hiding, the system 200b may include one or more firewalls (FWs) and/or network address translation (NAT) virtual machines (VMs), such as for example the FW/NAT VM 232b shown in FIG. 2B. While a single instance of a FW/NAT VM (namely: FW/NAT VM 232b) is shown in FIG. 2B, aspects of the FW/NAT VM 232b may be replicated/repeated to facilitate, e.g., redundancy/reliability, load-balancing/sharing, etc.

The FW aspects of the FW/NAT VM 232b may implement security rules or policies to selectively enable or disable communications from reaching one or more entities. For example, the FW aspects may protect the workers 202b-1 through 202b-3 from traffic generated by, e.g., one or more rogue/misconfigured PE routers and/or may protect the CE router 210b and/or the PE router 220b from traffic generated by, e.g., one or more rogue/misconfigured workers.

The NAT aspects of the FW/NAT VM 232b may facilitate routing traffic from, e.g., the PE router 220b to an appropriate worker (e.g., the worker 202b-1). The NAT aspects of the FW/NAT VM 232b may facilitate routing traffic from, e.g., a given worker (e.g., the worker 202b-1) to an appropriate CE router (e.g., the CE router 210b); the CE router, in turn, may route that traffic (as potentially subject to any modifications that may be performed upon the traffic by the CE router) to an appropriate PE router (e.g., the PE router 220b). Address translation/modification may be provided by the NAT aspects along the path from the source of the traffic to the destination of the traffic.

In some embodiments, aspects of the FW and/or the NAT may be selectively or dynamically instantiated (e.g., may be instantiated/inserted "on the fly"). For example, a detection of traffic with a given address or Service IP (or an address or Service IP within a range of addresses or service IPs) may result in an instantiation or insertion of a FW and/or a NAT. In some embodiments, aspects of routing or security implemented by a NAT or FW may conform with a static or predetermined configuration. For example, in some embodiments one or more of the workers (e.g., the worker 202b-1) may be configured with a static route corresponding to a next-hop of a specific FW and/or NAT VM.

Aspects of the control plane in FIG. 2B may correspond to one or more local area networks (LANs). For example, aspects of the communications over the control plane between the workers 202b-1 through 202b-3 and the FW/NAT VM 232b may correspond to/occur via a first LAN (represented as LAN1 in FIG. 2B). By extension, aspects of the communications over the control plane between the FW/NAT VM 232b and the CE router 210b may correspond to/occur via the first LAN, or a derivative of the first LAN (as represented by reference character LAN1' in FIG. 2B).

Figure 2C:
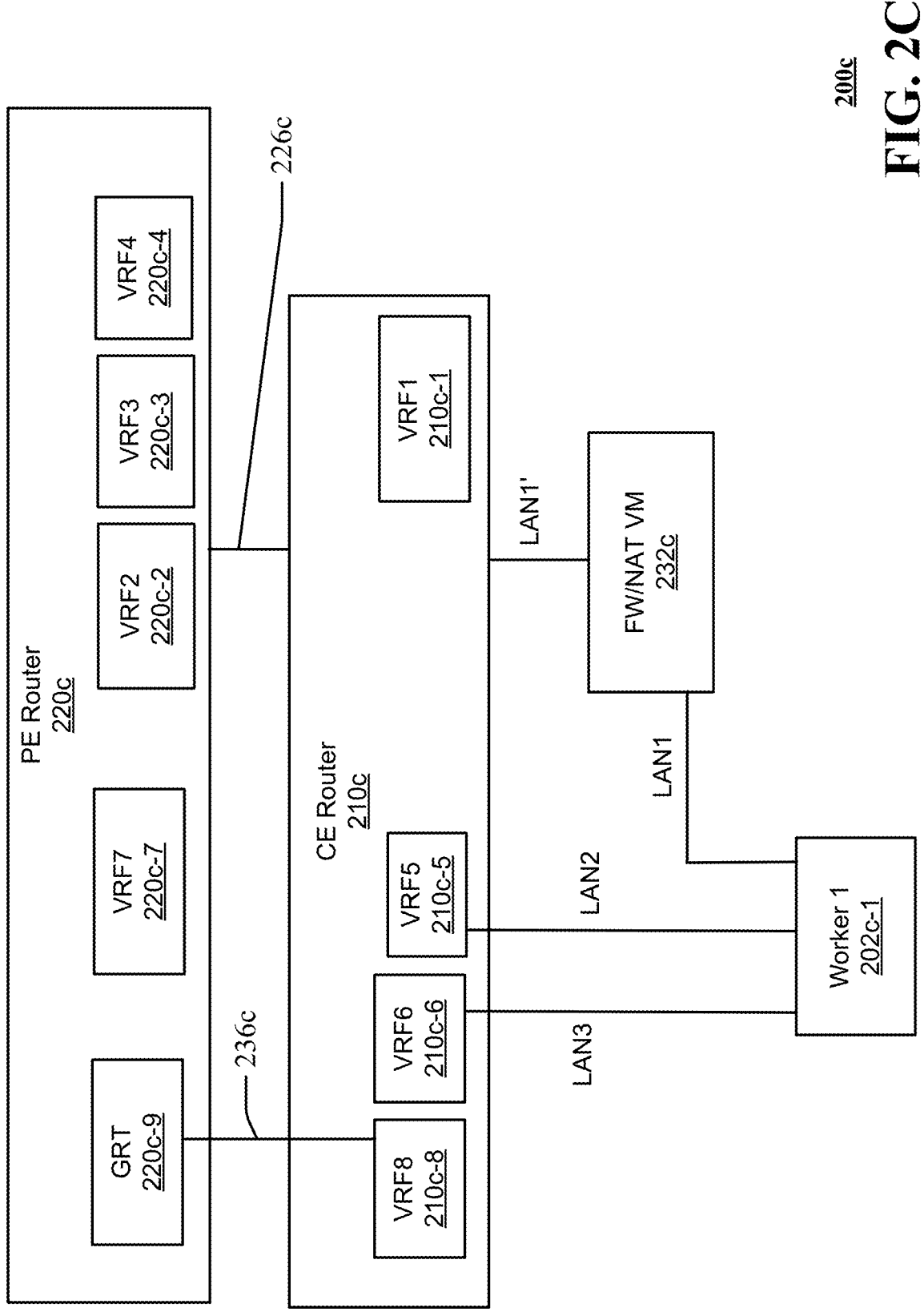

Referring now to FIG. 2C, an illustrative embodiment of a system 200c in accordance with aspects of this disclosure is shown. In some embodiments, one or more parts/portions of the system 200c may function within, or may be operatively overlaid upon, one or more parts/portions of the system 100 of FIG. 1. While shown separately, in some embodiments one or more aspects of the system 200c may be combined with one or more aspects of the system 200a and/or the system 200*b*, which is to say that aspects of the system 200*c* and aspects of the system 200*a* and/or the system 200*b* may be included as part of a larger system. For example, whereas aspects of the system 200*b* were described above as facilitating a processing of north-south or vertically-oriented communications/traffic in relation to a control plane (e.g., a 5G control plane), aspects of the system 200*c* may facilitate a processing of north-south or vertically-oriented communications/traffic in relation to a data or user plane (e.g., a 5G data or user plane).

The system 200*c* may include one or more workers, such as for example a worker 202*c*-1 (which, in some instances, may incorporate aspects of a worker shown in FIGS. 2A-2B). The system 200*c* may include a CE router 210*c* (which, in some instances, may incorporate aspects of a CE router shown in FIGS. 2A-2B). The system 200*c* may include a PE router 220*c* (which, in some instances, may incorporate aspects of the PE router 220*b* shown in FIG. 2B). The system 200*c* may include a FW/NAT VM 232*c* (which, in some instances, may incorporate aspects of the FW/NAT VM 232*b* shown in FIG. 2B). The CE router 210*c* may include a first VRF (represented as VRF1 210*c*-1) and the PE router 220*c* may include a second VRF (represented as VRF2 220*c*-2), a third VRF (represented as VRF3 220*c*-3), and a fourth VRF (represented as VRF4 220*c*-4). The VRFs 210*c*-1 and 220*c*-2 through 220*c*-4 and the FW/NAT VM 232*c* may be associated with/facilitate control plane functionality, similar to what was described above in connection with FIG. 2B. For example, the network labels LAN1 and LAN1' are carried forward from FIG. 2B to FIG. 2C in relation to the same. Communications between the CE router 210*c* and the PE router 220*c* may be facilitated by a link 226*c* (where the link 226*c* may, in some embodiments, incorporate/include aspects associated with the link 226*b* of FIG. 2B).

As described above, aspects of the system 200*c* may facilitate user or data plane communications. To demonstrate, a first pod of the worker 202*c*-1 (see pod 206*a*-1 in FIG. 2A as an example of a pod included in a worker) may be communicatively coupled with a fifth VRF (represented as VRF5 210*c*-5) of the CE router 210*c* by way of a second LAN (represented as LAN2). Similarly, a second pod of the worker 202*c*-1 (see, e.g., pod 206*a*-2 in FIG. 2A) may be communicatively coupled with a sixth VRF (represented as VRF6 210*c*-6) of the CE router 210*c* by way of a third LAN (represented as LAN3). In contrast with the control plane traffic associated with the worker 202*c*-1, the user plane traffic associated with the worker 202*c*-1 might not traverse the FW/NAT VM 232*c*; e.g., a direct connection may be provided for the user plane traffic between the worker 202*c*-1 and the CE router 210*c* (or corresponding VRFs). Aspects of a FW or NAT for the user plane traffic may be subsumed within, e.g., the (pods of the) worker 202*c*-1 and/or VRFs of the CE router 210*c* in some embodiments.

The user plane traffic associated with the worker 202*c*-1 may be conveyed to or from the PE router 220*c*, as potentially subject to modification by the CE router 210*c*, by way of the link 226*c*. The user plane traffic associated with the worker 202*c*-1 may be supported by one or more VRFs of the PE router 220*c*, such as for example a seventh VRF (represented as VRF7 220*c*-7).

In some embodiments, another link (beyond the link 226*c*) may be included/incorporated between the CE router 210*c* and the PE router 220*c*. For example, a link 236*c* is shown between an eighth VRF (represented a VRF8 210*c*-8) of the CE router 210*c* and a GRT 220*c*-9 of the PE router 220*c*. The GRT 220*c*-9 may correspond to, or include, a global routing table for specific or particular types of traffic, such as Internet traffic. While shown separately, in some embodiments the link 236*c* (supportive of the traffic associated with the GRT 220*c*-9/VRF8 210*c*-8) may be subsumed within the link 226*c*; for example, traffic associated with the link 236*c* may correspond to a label included within a plurality of labels supported/used by the link 226*c*.

While some of the example use-cases/scenarios described above pertained to 5G technology, aspects of the systems 200*a*-200*c* may be utilized in connection with other technologies, such as for example 4G technologies. The FWs/NATs shown in FIGS. 2B-2C may be referred to more generally as an appliance. Other types of appliances that may be used in some embodiments may include an operations, administration, and maintenance (OAM) appliance, a domain name system (DNS) appliance, etc.

Figure 2D:
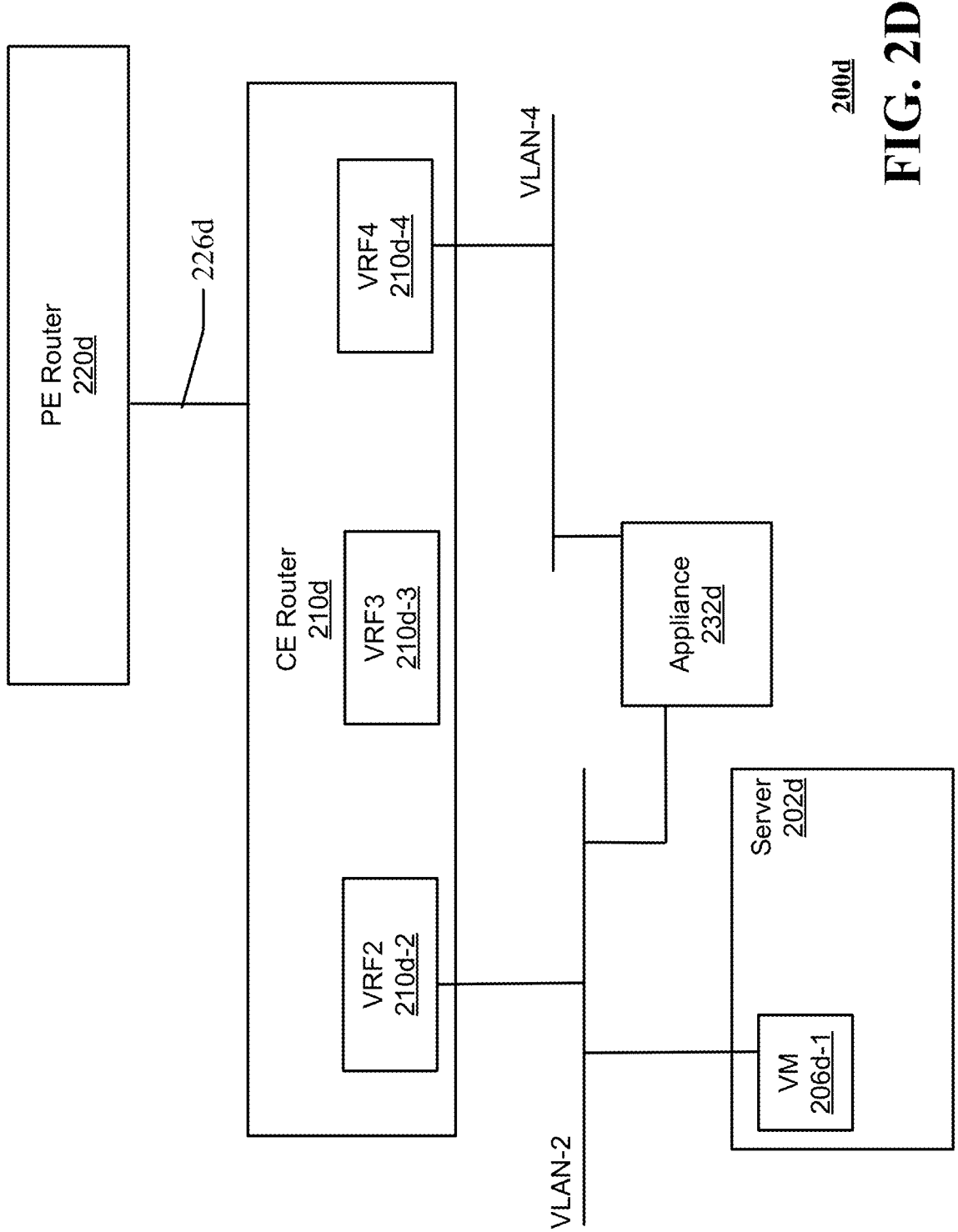

Referring now to FIG. 2D, an illustrative embodiment of a system 200*d* in accordance with aspects of this disclosure is shown. In some embodiments, one or more parts/portions of the system 200*d* may function within, or may be operatively overlaid upon, one or more parts/portions of the system 100 of FIG. 1. While shown separately, in some embodiments one or more aspects of the system 200*d* may be combined with one or more aspects of the system 200*a*, the system 200*b*, and/or the system 200*c*, which is to say that aspects of the system 200*d* and aspects of the system 200*a*, the system 200*b*, and/or the system 200*c* may be included as part of a larger system. In some embodiments, the system 200*d* may be associated with a telecommunication system operative in accordance with one or more technologies, such as 4G technology.

The system 200*d* may include a CE router 210*d* and a PE router 220*d* operatively coupled by a link 226*d* (which may correspond to the link 226*b* and/or the link 226*c* of FIGS. 2B-2C). In some embodiments, the CE router 210*d* may include/incorporate aspects of the CE router 210*a*-1, the CE router 210*a*-2, the CE router 210*b* and/or the CE router 210*c*. In some embodiments, the PE router 220*d* may include/incorporate aspects of the PE router 220*b* and/or the PE router 220*c*.

The CE router 210*d* may include one or more VRFs, such as a VRF2 210*d*-2, a VFR3 210*d*-3, and a VRF4 210*d*-4. The VRFs of the CE router 210*d* may share characteristics in common with one or more of the VRFs of FIGS. 2A-2C.

The VRF2 210*d*-2 may be communicatively coupled to a server 202*d* (which may correspond to an instance of a worker as shown in FIGS. 2A-2C) by way of a virtual LAN—e.g., VLAN-2 shown in FIG. 2D. For example, the VRF2 210*d*-2 may be coupled via the VLAN-2 to a VM 206*d*-1 (which may correspond to an instance of a pod as shown in FIG. 2A) of the server 202*d*. An appliance 232*d* may also be coupled to the VLAN-2 and the VRF4 210*d*-4 via another virtual LAN (e.g., VLAN-4).

Thus, as shown in FIG. 2D, an appliance (e.g., the appliance 232*d*) may be inserted/instantiated between two VRFs (e.g., the VRF2 210*d*-2 and the VRF4 210*d*-4 of the CE router 210*d*). In operation, the VM 206*d*-1 may advertise over a session (e.g., a BGP session) to the VRF2 210*d*-2 prefixes associated with identifiers, such as virtual IP (VIP) addresses, NAT ranges, proxy ranges, etc. Routes that are learned local to the VRF2 210*d*-2 may be re-advertised over locally-connected sessions, such as locally-connected BGP sessions, in a direction towards the appliance 232*d*. In turn, the appliance 232*d* may re-advertise those routes to the VRF4 210*d*-4 as part of an associated session (e.g., an associated BGP session). In a reciprocal fashion/manner, the VRF4 210*d*-4 may advertise some routes (e.g., those routes with a specified BGP community value), or even all routes, that the VRF4 210*d*-4 learns locally to the VRF2 210*d*-2 by way of a conveyance via the appliance 232*d*. To the extent that the appliance 232*d* incorporates FW functionality, the appliance 232*d* may provide FW-related rules to the VRF2 210*d*-2 and/or the VRF4 210*d*-4.

Figure 2E:
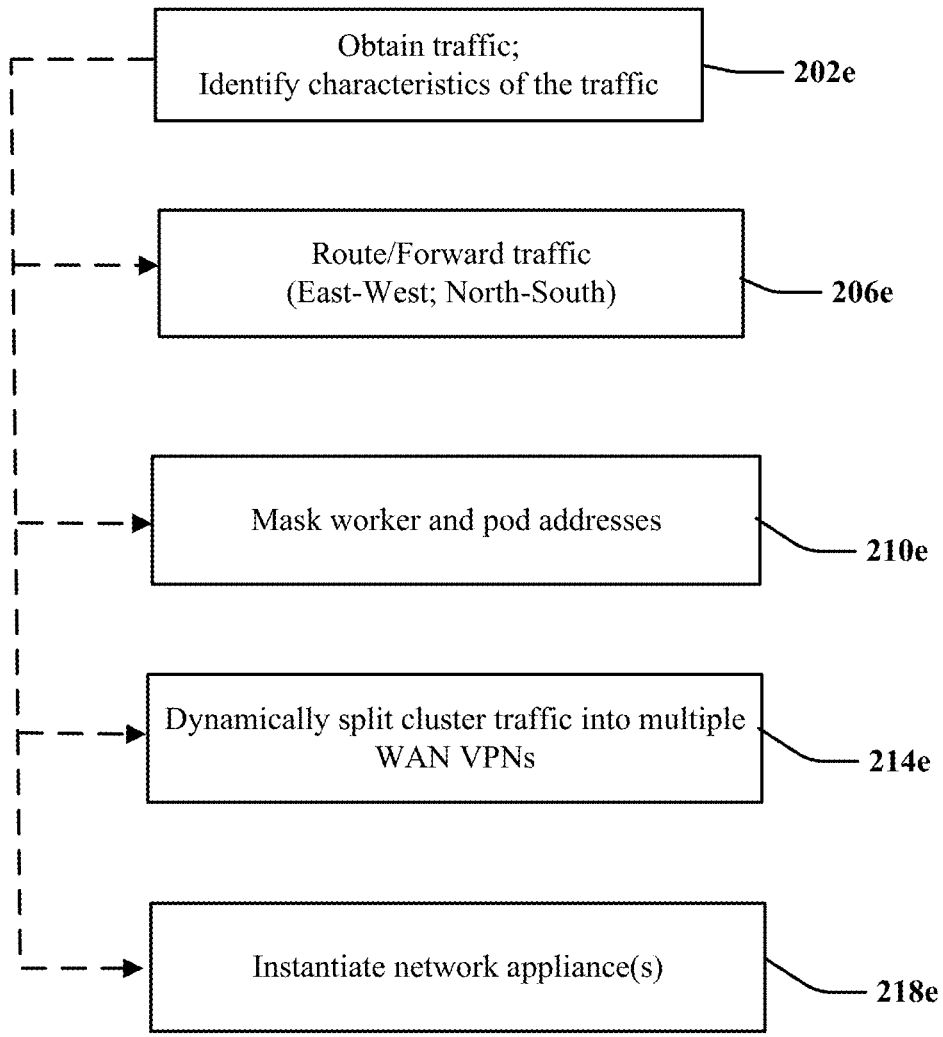
FIG. 2E depicts an illustrative embodiment of a method in accordance with various aspects described herein.

Referring now to FIG. 2E, an illustrative embodiment of a method 200*e* in accordance with various aspects described herein is shown. The method 200*e* may be implemented or executed, in whole or in part, in conjunction with one or more systems, devices, and/or components, such as for example the systems, devices, and components set forth herein. The method 200*e* may be utilized to facilitate a processing of traffic or communications, potentially as part of one or more applications. The processing of traffic/ communications may include a performance of one or more actions, the one or more action potentially including, without limitation, routing, filtering, modifying, etc., the traffic/ communications.

In block 202*e*, traffic may be obtained. Based on the obtaining of the traffic, characteristics (or a type) of the traffic may be identified as part of block 202*e*. For example, the identified (type) characteristics may include, without limitation, one or more of: (1) an identification of whether a conveyance of the traffic is internal to a (private) cloud network/system or traverses a boundary of the cloud network/system, (2) an identification of an orientation of the traffic (e.g., north-south/vertical versus east-west/horizontal), (3) an identification of whether the traffic corresponds to control or signal plane traffic, (4) an identification of whether the traffic corresponds to user or data plane traffic, (5) a type of technology (e.g., 6G, 5G, 4G, etc.) that is associated with the traffic, (6) an identification of a source or destination of the traffic, (7) an identification of an application that is associated with the traffic, etc.

Based on the characteristics identified as part of block 202*e*, one or more of the other blocks or operations of the method 200*e* may be executed. For example:

assuming that the traffic in question is control plane traffic oriented in a horizontal direction (see block 206*e*), the traffic may be processed in accordance with aspects of the system 200*a* described above; e.g., a routing of the traffic may be facilitated amongst workers of a cluster/domain and/or a routing may be facilitated from a first CE router of a given cluster/domain to one or more other CE routers of one or more other clusters/domains.

assuming that the traffic in question is control plane traffic orientated in a vertical direction (see block 206*e*), the traffic may be routed in accordance with aspects of the system 200*b* described above; e.g., the traffic may be subjected to processing via one or more network appliances (e.g., FW, NAT, OAM, etc., or any combination thereof—see, e.g., block 210*e*), and may include an instantiation of the network appliance(s) (see block 218*e*).

assuming that the traffic in question is user plane traffic orientated in a vertical direction (see block 206*e*), the traffic may be routed in accordance with aspects of the system 200*c* described above; e.g., the traffic may be routed between a worker (pod) or server (VM) of the cloud and a PE router (potentially inclusive of one or more entities of the PE router, such as VRFs associated with one or more VPNs-see block 214*e*) by way of a CE router (e.g., by way of one or more VRFs of the CE router) and one or more links (see, e.g., link 226*c*, link 236*c*).

assuming that the traffic in question requires processing via an appliance between VRFs on a CE router, the traffic may be routed in accordance with aspects of the system 200*d* described above; e.g., the traffic may be routed from a first VRF (e.g., VRF2 210*d*-2) of the CE router to a second VRF of the CE router (see, e.g., VRF4 210*d*-4) by way of one or more appliances (see, e.g., appliance 232*d*), and may include an instantiation of the appliance(s) (see block 218*e*).

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may facilitate routing of traffic (e.g., intra-cloud traffic, inter-cloud traffic, or combinations thereof) in a bare-metal non-public (e.g., private) cloud platform, potentially in accordance with single-root input/ output virtualization (SR-IOV) technology. In some embodiments, Kubernetes (k8s) worker and/or pod IP addresses may be hidden/masked relative to an exterior of the cloud platform. Aspects of this disclosure have demonstrated an ability to separate or split k8s traffic in relation to networks (e.g., wide-area network or WANs, virtual private networks (VPNs), and the like). Aspects of this disclosure have demonstrated an insertion of a network appliance (such as a firewall, a network address translator, etc.) into the path or flow of traffic. Aspects of this disclosure may be replicated to achieve particular units or metrics of scale, reliability, functionality, security, etc.

In some embodiments, a physical router provided by a cloud operator (such as, for example, a CE router described above) may be used as a first-hop router for traffic within a cloud platform. K8s cluster Service IPs may be advertised by workers/worker nodes towards the CE router, and the CE router may maintain such Service IPs as part of one or more tables. When new, external services are added, they may be automatically advertised/announced, and hence may be reachable via the CE router. FW and/or NAT functionality may selectively be utilized in respect of traffic that leaves or enters the cloud platform. In some embodiments, appliances or associated functionality (e.g., FW or NAT functionality) may be inserted/instantiated "on the fly", such as for example in relation to a Service IP matching a given range of Service IPs on ingress to the cloud. On egress from the cloud, a static route on a worker/worker node may be utilized with a next-hop to a specified appliance.

In some embodiments, such as in relation to k8s, a primary pod interface may be used by k8s APIs. Secondary or non-primary pod interfaces (e.g., Multus interfaces) may belong to specified VLANs and BGP sessions terminating on a CE router in relation to VRFs that represent specific VPNs. The VRFs may be BGP/MPLS VPN-enabled or compliant. The CE router may establish an external or internal BGP or Multiprotocol-BGP session (e.g., an MP-iBGP or MP-eBGP session) with a PE router of a user/ customer, over which route-information may be exchanged. The CE router may receiver all the routes from the user/ customer side from the PE router and may incorporate the same as part of one or more VRFs at the CE router; the CE router may advertise all externally reachable routes received over interfaces (e.g., Multus interfaces) towards the PE router. Routing and forwarding activities used with plugins (e.g., Multus plugins) may be applied to non-primary interfaces of k8s pods.

Aspects of this disclosure represent substantial improvements relative to conventional technologies in relation to many practical applications. For example, a cloud user/ customer may obtain the benefit of a cloud platform with operational simplicity. To demonstrate, a cloud user/customer may physically and logically connect its router (e.g., a PE router as described above) to the cloud operator's router (e.g., the CE router described above) with the cloud user/customer's configuration being static; any application and/or service modifications or additions are added to the cloud operator's resources. Furthermore, aspects of this disclosure may tend to obscure or hide addresses (e.g., IP addresses) of the cloud's infrastructure, including k8s clusters and VMs. For example, a user/customer of the cloud platform might only know of addresses that are Service IPs and FW/NAT ranges. As a result, IP address savings may be realized, which in turn may simplify IP address assignment. Aspects of this disclosure provide for a public cloud-like look and feel in respect of a non-public/private cloud. In turn, an understanding of and porting of operations between cloud platforms may be more readily facilitated.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200a-200d, and method 200e presented in FIGS. 1, 2A-2D, and 2E. For example, virtualized communication network 300 can facilitate in whole or in part obtaining traffic that is conveyed at least in part within a private cloud network, based on the obtaining, identifying characteristics of the traffic, and based on the identifying of the characteristics of the traffic, causing at least one action to be performed within the private cloud network. Virtualized communication network 300 can facilitate in whole or in part identifying first characteristics of first traffic, wherein the first characteristics include an identification of the first traffic as being associated with a control plane and an identification that the first traffic traverses a boundary of a first network corresponding to a bare-metal private cloud network, based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network, identifying second characteristics of second traffic originating from a first pod of a first node of the first network, wherein the second characteristics include an identification of the second traffic as being associated with a user plane, based on the identifying of the second characteristics of the second traffic, conveying the second traffic between the first pod and the first router of the second network via a first virtual routing function (VRF) of a second router of the first network and a link between the second router and the first router, identifying third characteristics of third traffic originating from a second pod of the first node of the first network, wherein the third characteristics include an identification of the third traffic as being associated with the user plane, and based on the identifying of the third characteristics of the third traffic, conveying the third traffic between the second pod and the first router of the second network via a second VRF of the second router and the link. Virtualized communication network 300 can facilitate in whole or in part obtaining, by a processing system including a processor, first traffic from a first node of a private cloud network, identifying, by the processing system and based on the obtaining, that the first traffic corresponds to an execution of a first application associated with a telecommunication service, instantiating, by the processing system and based on the identifying, an appliance, and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
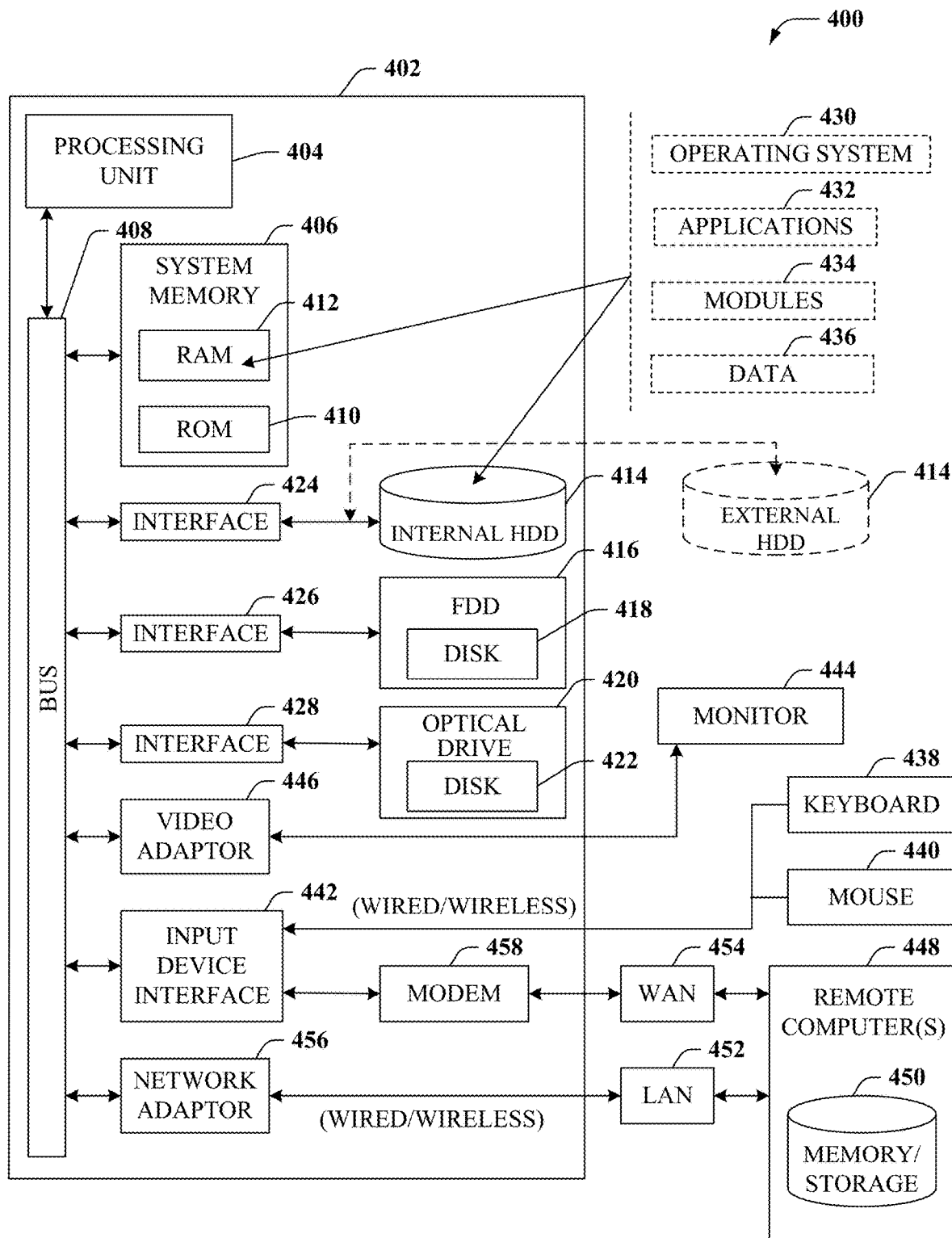
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining traffic that is conveyed at least in part within a private cloud network, based on the obtaining, identifying characteristics of the traffic, and based on the identifying of the characteristics of the traffic, causing at least one action to be performed within the private cloud network. Computing environment 400 can facilitate in whole or in part identifying first characteristics of first traffic, wherein the first characteristics include an identification of the first traffic as being associated with a control plane and an identification that the first traffic traverses a boundary of a first network corresponding to a bare-metal private cloud network, based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network, identifying second characteristics of second traffic originating from a first pod of a first node of the first network, wherein the second characteristics include an identification of the second traffic as being associated with a user plane, based on the identifying of the second characteristics of the second traffic, conveying the second traffic between the first pod and the first router of the second network via a first virtual routing function (VRF) of a second router of the first network and a link between the second router and the first router, identifying third characteristics of third traffic originating from a second pod of the first node of the first network, wherein the third characteristics include an identification of the third traffic as being associated with the user plane, and based on the identifying of the third characteristics of the third traffic, conveying the third traffic between the second pod and the first router of the second network via a second VRF of the second router and the link. Computing environment 400 can facilitate in whole or in part obtaining, by a processing system including a processor, first traffic from a first node of a private cloud network, identifying, by the processing system and based on the obtaining, that the first traffic corresponds to an execution of a first application associated with a telecommunication service, instantiating, by the processing system and based on the identifying, an appliance, and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
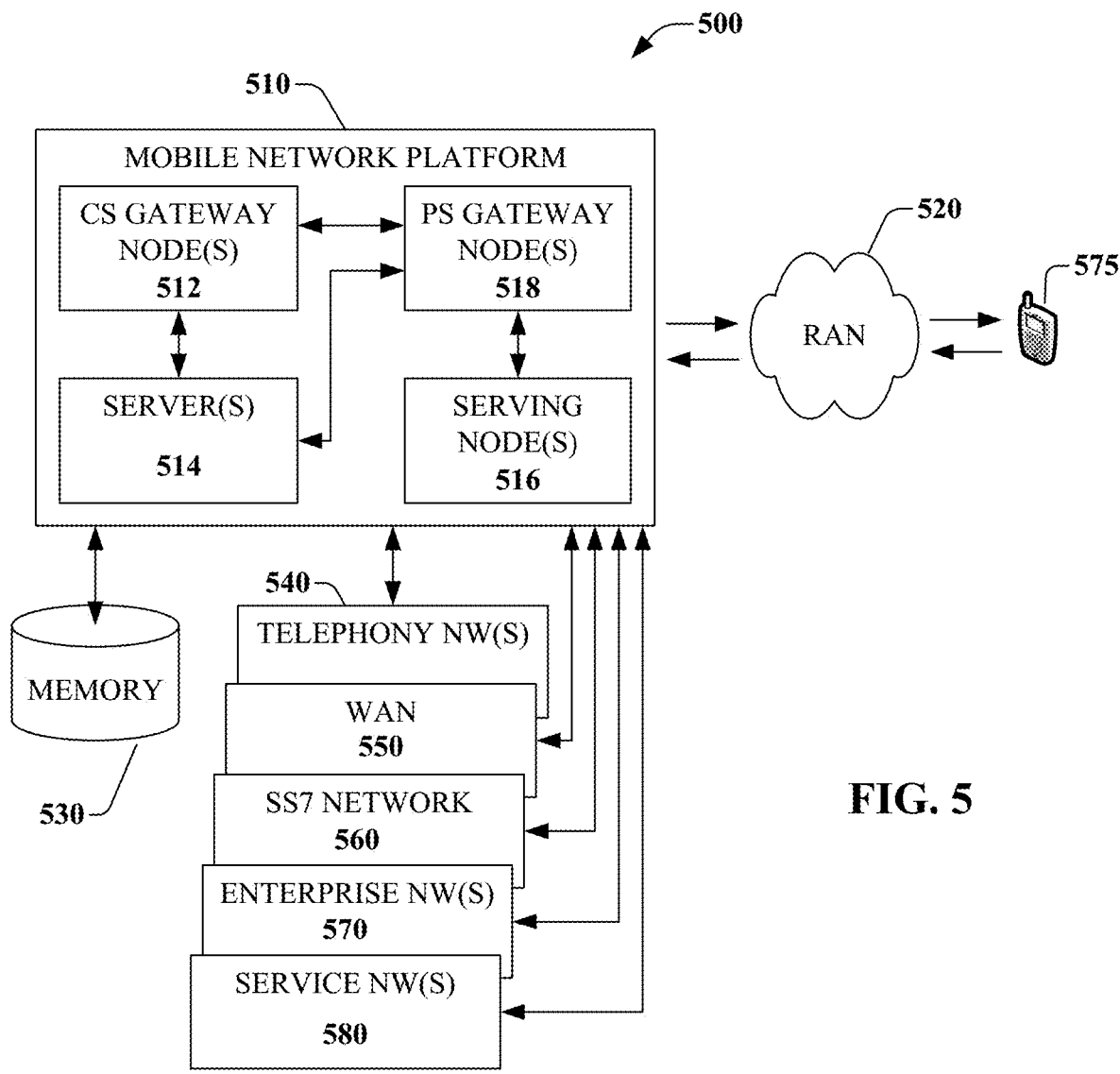
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining traffic that is conveyed at least in part within a private cloud network, based on the obtaining, identifying characteristics of the traffic, and based on the identifying of the characteristics of the traffic, causing at least one action to be performed within the private cloud network. Platform 510 can facilitate in whole or in part identifying first characteristics of first traffic, wherein the first characteristics include an identification of the first traffic as being associated with a control plane and an identification that the first traffic traverses a boundary of a first network corresponding to a bare-metal private cloud network, based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network, identifying second characteristics of second traffic originating from a first pod of a first node of the first network, wherein the second characteristics include an identification of the second traffic as being associated with a user plane, based on the identifying of the second characteristics of the second traffic, conveying the second traffic between the first pod and the first router of the second network via a first virtual routing function (VRF) of a second router of the first network and a link between the second router and the first router, identifying third characteristics of third traffic originating from a second pod of the first node of the first network, wherein the third characteristics include an identification of the third traffic as being associated with the user plane, and based on the identifying of the third characteristics of the third traffic, conveying the third traffic between the second pod and the first router of the second network via a second VRF of the second router and the link. Platform 510 can facilitate in whole or in part obtaining, by a processing system including a processor, first traffic from a first node of a private cloud network, identifying, by the processing system and based on the obtaining, that the first traffic corresponds to an execution of a first application associated with a telecommunication service, instantiating, by the processing system and based on the identifying, an appliance, and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s)

512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
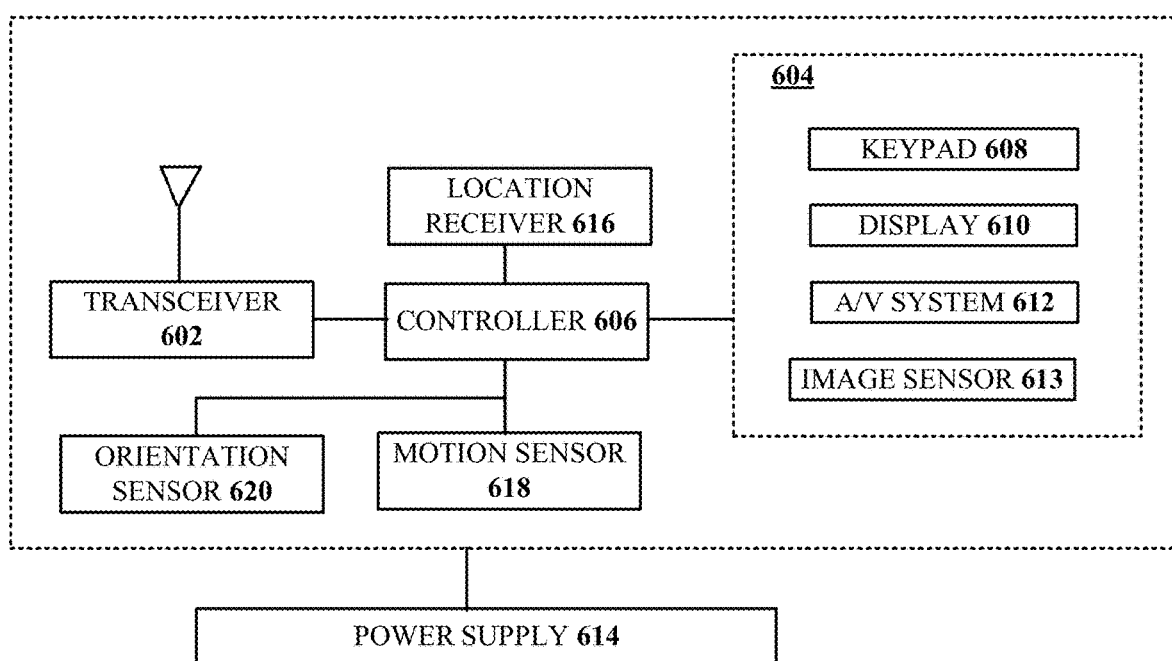
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining traffic that is conveyed at least in part within a private cloud network, based on the obtaining, identifying characteristics of the traffic, and based on the identifying of the characteristics of the traffic, causing at least one action to be performed within the private cloud network. Computing device 600 can facilitate in whole or in part identifying first characteristics of first traffic, wherein the first characteristics include an identification of the first traffic as being associated with a control plane and an identification that the first traffic traverses a boundary of a first network corresponding to a bare-metal private cloud network, based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network, identifying second characteristics of second traffic originating from a first pod of a first node of the first network, wherein the second characteristics include an identification of the second traffic as being associated with a user plane, based on the identifying of the second characteristics of the second traffic, conveying the second traffic between the first pod and the first router of the second network via a first virtual routing function (VRF) of a second router of the first network and a link between the second router and the first router, identifying third characteristics of third traffic originating from a second pod of the first node of the first network, wherein the third characteristics include an identification of the third traffic as being associated with the user plane, and based on the identifying of the third characteristics of the third traffic, conveying the third traffic between the second pod and the first router of the second network via a second VRF of the second router and the link. Computing device 600 can facilitate in whole or in part obtaining, by a processing system including a processor, first traffic from a first node of a private cloud network, identifying, by the processing system and based on the obtaining, that the first traffic corresponds to an execution of a first application associated with a telecommunication service, instantiating, by the processing system and based on the identifying, an appliance, and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining, and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    obtaining traffic that is conveyed at least in part within a private cloud network;
    based on the obtaining, identifying characteristics of the traffic, wherein the characteristics identified include whether the traffic traverses a boundary of the private cloud network, whether an orientation is horizontal or vertical, whether the traffic is for a control plane or a user plane, a technology type, a source or destination, and whether there is an associated application for the traffic; and
    based on the identifying of the characteristics of the traffic, causing at least one action to be performed within the private cloud network.

2. The device of claim 1, wherein the identifying of the characteristics of the traffic includes identifying the traffic as being associated with the control plane.

3. The device of claim 2, wherein the identifying of the characteristics of the traffic includes identifying the traffic as being contained within the private cloud network.

4. The device of claim 3, wherein the causing of the at least one action to be performed includes causing the traffic to be routed from a first node of the private cloud network to at least one second node of the private cloud network.

5. The device of claim 4, wherein the first node and the at least one second node are part of a cluster communicatively coupled to a router, and wherein the causing of the traffic to be routed from the first node of the private cloud network to the at least one second node of the private cloud network includes causing the traffic to be routed via the router.

6. The device of claim 4, wherein the first node is part of a first cluster of nodes communicatively coupled to a first router of the private cloud network and the at least one second node is part of a second cluster of nodes communicatively coupled to a second router of the private cloud network, and wherein the causing of the traffic to be routed from the first node of the private cloud network to the at least one second node of the private cloud network includes causing the traffic to be routed from the first router to the second router.

7. The device of claim 2, wherein the identifying of the characteristics of the traffic includes identifying the traffic as crossing the boundary of the private cloud network.

8. The device of claim 7, wherein the causing of the at least one action to be performed includes causing the traffic to be routed to a firewall, wherein the firewall detects whether the traffic is malicious.

9. The device of claim 8, wherein when the firewall detects that the traffic is not malicious the traffic is conveyed between a node of the private cloud network and a router of a second network that is different from the private cloud network.

10. The device of claim 7, wherein the causing of the at least one action to be performed includes causing the traffic to be subjected to a network address translation.

11. The device of claim 10, wherein the traffic originates from a first router of a second network that is different from the private cloud network, wherein the traffic is associated with a first identifier corresponding to a Kubernetes-compliant application, and wherein the network address translation includes translating the first identifier to a second identifier associated with a first node of the private cloud network that is the destination of the traffic.

12. The device of claim 11, wherein the traffic is conveyed from the first router to a second router of the private cloud network by way of a link.

13. The device of claim 12, wherein the operations further comprise:
    conveying second traffic via the link from the second router to the first router.

14. The device of claim 13, wherein the conveying of the second traffic via the link from the second router to the first router includes conveying the second traffic to a first virtual routing function (VRF) of the first router based on a label associated with the second traffic.

15. The device of claim 1, wherein the identifying of the characteristics of the traffic includes identifying the traffic as being associated with the user plane.

16. The device of claim 15, wherein the causing of the at least one action to be performed includes causing the traffic to be routed between a node of the private cloud network and a virtual routing function (VRF) of a router of the private cloud network.

17. The device of claim 15, wherein the causing of the at least one action to be performed includes causing the traffic to be routed between a first virtual routing function (VRF) of a router of the private cloud network and a second VRF of the router by way of an appliance.

18. The device of claim 17, wherein the causing of the at least one action to be performed includes causing the appliance to be instantiated based on a determination that an identifier associated with the traffic is within a range of identifiers.

19. A non-transitory machine-readable medium, comprising executable instructions that, when executed by a processing system including a processor, facilitate performance of operations, the operations comprising:

identifying first characteristics of first traffic, wherein the first characteristics include an identification of the first traffic as being associated with a control plane and an identification that the first traffic traverses a boundary of a first network corresponding to a bare-metal private cloud network;

based on the identifying of the first characteristics of the first traffic, applying at least one of a firewall function, a network address translation function, or an operations, administration, and maintenance (OAM) function to the first traffic in conveying the first traffic between a node of the first network and a first router of a second network that is external to the first network;

identifying second characteristics of second traffic originating from a first pod of a first node of the first network, wherein the second characteristics include an identification of the second traffic as being associated with a user plane;

based on the identifying of the second characteristics of the second traffic, conveying the second traffic between the first pod and the first router of the second network via a first virtual routing function (VRF) of a second router of the first network and a link between the second router and the first router;

identifying third characteristics of third traffic originating from a second pod of the first node of the first network, wherein the third characteristics include an identification of the third traffic as being associated with the user plane; and based on the identifying of the third characteristics of the third traffic, conveying the third traffic between the second pod and the first router of the second network via a second VRF of the second router and the link.

20. A method, comprising:

obtaining, by a processing system including a processor, first traffic from a first node of a private cloud network;

identifying, by the processing system and based on the obtaining, characteristics of the first traffic, wherein the characteristics identified include whether the first traffic traverses a boundary of the private cloud network, whether an orientation is horizontal or vertical, whether the first traffic is for a control plane or a user plane, a technology type, a source or destination, and whether there is an associated application for the first traffic;

determining that the first traffic corresponds to an execution of a first application associated with a telecommunication service;

instantiating, by the processing system and based on the identifying, an appliance; and conveying, by the processing system and based on the instantiating, the first traffic from a first virtual routing function (VRF) of a first router of the private cloud network to a second VRF of the first router via the appliance, wherein the appliance processes the first traffic to generate second traffic, and wherein the first router conveys the second traffic via the second VRF to a second router of a network managed by an operator of the telecommunication service.

\* \* \* \* \*